US010601319B2

(12) United States Patent
Hansen et al.

(10) Patent No.: US 10,601,319 B2
(45) Date of Patent: Mar. 24, 2020

(54) VOLTAGE CONVERTER AND METHOD FOR CONVERTING A VOLTAGE FROM AN INPUT VOLTAGE TO AN OUTPUT VOLTAGE THAT IS LARGER THAN THE INPUT VOLTAGE BY A FIXED ADDITIONAL VALUE

(71) Applicant: CONTINENTAL AUTOMOTIVE GmbH, Hannover (DE)

(72) Inventors: Thomas-Tarp Hansen, Hobro (DK); Finn Frederiksen, Hals (DK)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/310,352

(22) PCT Filed: May 24, 2017

(86) PCT No.: PCT/EP2017/062595
§ 371 (c)(1),
(2) Date: Dec. 14, 2018

(87) PCT Pub. No.: WO2017/215894
PCT Pub. Date: Dec. 21, 2017

(65) Prior Publication Data
US 2019/0149043 A1  May 16, 2019

(30) Foreign Application Priority Data
Jun. 17, 2016  (EP) ..................................... 16174966

(51) Int. Cl.
*H02M 3/156* (2006.01)
*H02M 1/00* (2006.01)

(52) U.S. Cl.
CPC .... *H02M 3/156* (2013.01); *H02M 2001/0093* (2013.01)

(58) Field of Classification Search
CPC ................. H02M 3/156; H02M 3/157; H02M 3/158–1588; H02M 2001/0006
See application file for complete search history.

(56) References Cited

U.S. PATENT DOCUMENTS 6,445,165 B1 * 9/2002 Malik .................... H02H 9/001
323/222
2008/0316779 A1 * 12/2008 Jayaraman .......... H02M 1/4225
363/74

(Continued)

OTHER PUBLICATIONS

TPS6104x Low-Power DC-DC Boost Converter in SOT-23 and WSON Packages (revised Oct. 2015); https://web.archive.org/web/20160421182500/http://www.ti.com/lit/ds/symlink/tps61040.pdf (Saved by Archive.org on Apr. 21, 2016, obtained Jul. 12, 2019).*

*Primary Examiner* — Fred E Finch, III
*Assistant Examiner* — Rafael O. De León Domenech
(74) *Attorney, Agent, or Firm* — Cozen O'Connor

(57) ABSTRACT

Voltage converter including at least: a boost circuit to convert an input voltage Vin to an output voltage Vout, a setpoint for the output voltage Vout is, by a fixed additional value Vf, larger than the input voltage Vin, and the fixed additional value is independent of the input voltage Vin measurement circuit emits an electrical trigger signal based on a difference between the output voltage Vout and the input voltage Vin, and a trigger circuit adjusts the output voltage Vout depending on the electrical trigger signal.

12 Claims, 1 Drawing Sheet

(56) References Cited

U.S. PATENT DOCUMENTS

| | | | |
|---|---|---|---|
| 2010/0080026 A1* | 4/2010 | Zhang | H02M 1/4225 |
| | | | 363/89 |
| 2012/0125705 A1 | 5/2012 | Hashimoto et al. | |
| 2012/0133432 A1* | 5/2012 | Gehrke | H03G 1/0088 |
| | | | 330/131 |
| 2014/0247030 A1* | 9/2014 | Sakai | H02M 3/04 |
| | | | 323/283 |
| 2015/0137784 A1* | 5/2015 | Sugawara | H02M 3/156 |
| | | | 323/282 |
| 2015/0264770 A1 | 9/2015 | Zhang et al. | |
| 2016/0181918 A1* | 6/2016 | Herfurth | H02M 1/08 |
| | | | 315/291 |

* cited by examiner

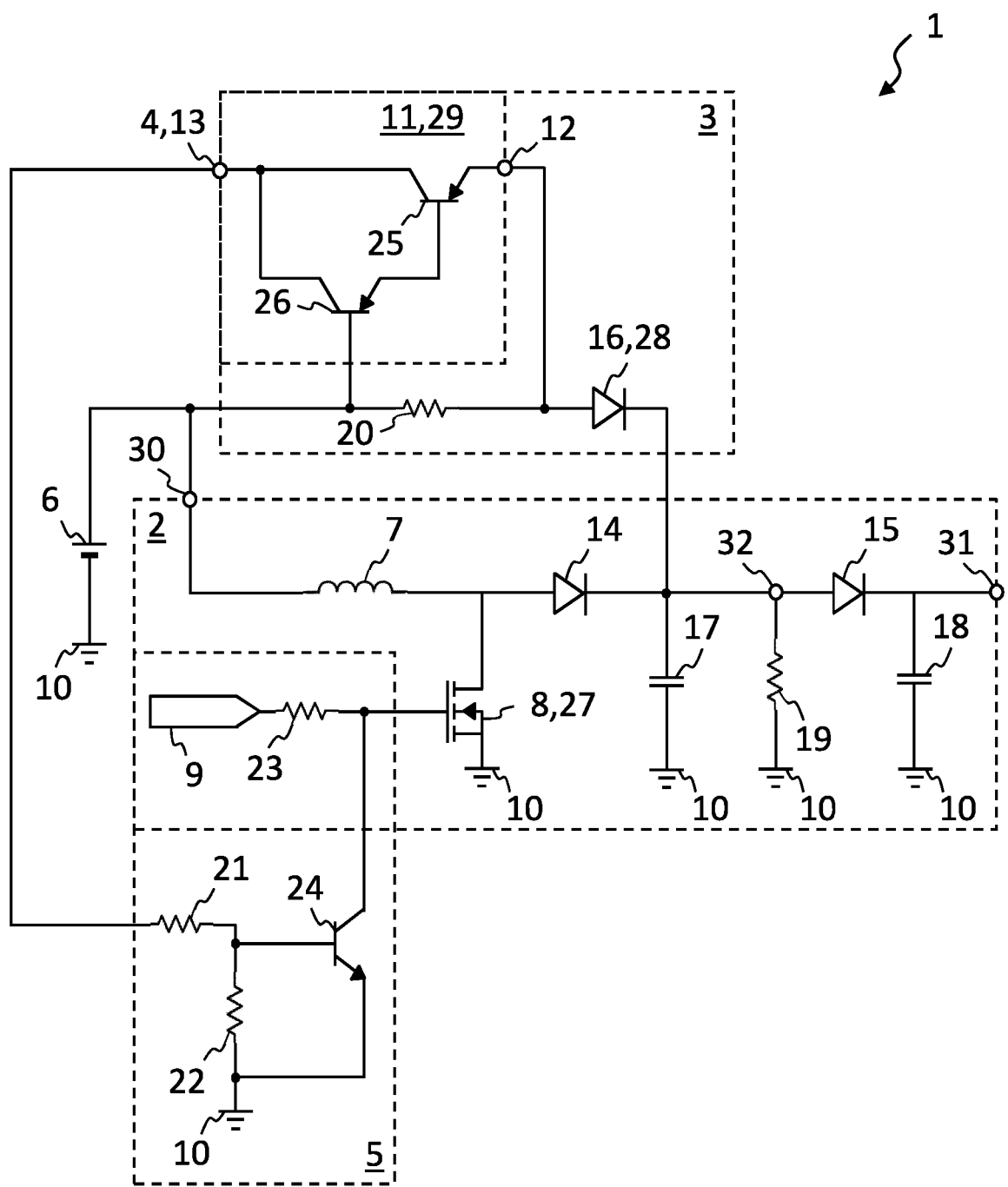

VOLTAGE CONVERTER AND METHOD FOR CONVERTING A VOLTAGE FROM AN INPUT VOLTAGE TO AN OUTPUT VOLTAGE THAT IS LARGER THAN THE INPUT VOLTAGE BY A FIXED ADDITIONAL VALUE

CROSS REFERENCE TO RELATED APPLICATIONS

This is a U.S. national stage of application No. PCT/EP2017/062595, filed on May 24, 2017. Priority is claimed on European Application No. EP16174966.8, filed Jun. 17, 2016, the content of which is incorporated herein by reference.

BACKGROUND OF THE INVENTION

1. Field of the Invention

The invention relates to a voltage converter and a method for converting an input voltage to an output voltage, which is, in particular, increased compared with the input voltage.

2. Description of the Prior Art

In a plurality of electronic applications it is required to either increase or decrease a voltage. A variety of electronic circuits are known for converting an input voltage to an output voltage, wherein the output voltage is increased or decreased compared with the input voltage. In particular, circuits are known, wherein an additional value is added to the input voltage. Such circuits are commonly known as boost converters. However, in known boost converters the additional value added to the input voltage depends on the input voltage, i.e. it is not possible to increase different input voltages by adding the same additional value. However, the latter is required, for example, in applications such as electronic switches for electrically heated catalysts as they are used in internal combustion engines and their exhaust gas systems in automobiles.

SUMMARY OF THE INVENTION

It is, therefore, an object of one aspect of the present invention to overcome at least in part the disadvantages known from prior art and in particular to provide a voltage converter and a method for converting any voltage by adding a fixed additional value.

The voltage converter comprises at least:
- a boost circuit configured for converting an input voltage Vin to an output voltage Vout;
- a measurement circuit configured to emit an electrical trigger signal based on a difference between the output voltage Vout and the input voltage Vin; and
- a trigger circuit configured to adjust the output voltage Vout depending on the electrical trigger signal, such that a setpoint for the output voltage Vout is, by a fixed additional value Vf, larger than the input voltage Vin, and that the fixed additional value is independent of the input voltage Vin.

The boost circuit, the measurement circuit and the trigger circuit, are subcircuits that form parts of an overall circuit, which is the voltage converter. The voltage converter is considered to be divided into the subcircuits mainly for better describability. There can be a multitude of interfaces and connections between the subcircuits. Also, the subcircuits may overlap.

The voltage converter preferably has a voltage converter input at a potential equal to the input voltage Vin. Further, the voltage converter preferably has a voltage converter output at a potential equal to the output voltage Vout. That is, if the input voltage Vin is applied between the voltage converter input and ground, the output voltage Vout can be tapped between the voltage converter output Vout and ground. Throughout the description, by the output voltage Vout the actual value of the output voltage Vout is meant. This actual value of the output voltage Vout has to be distinguished from the setpoint for the output voltage Vout. The (actual) output voltage Vout is preferred to be equal to the setpoint. If this is not the case, the (actual) output voltage Vout is preferably adjusted accordingly.

The input voltage Vin is assumed to be constant with time. That is, the input voltage is assumed to be provided by a voltage source capable of providing any required current for maintaining the input voltage Vin. Further, the voltage converter is assumed to be capable of providing any current for maintaining the output voltage Vout, in particular if the voltage converter is connected to a load (such as a resistor between the voltage converter output and ground). In reality, temporal deviations from the above assumptions are conceivable. However, these are minor effects that may only reveal in deviations from theoretically predicted result values rather than in a conceptually different behavior of the voltage converter.

The voltage converter input and the voltage converter output are preferably comprised within the boost circuit. The boost circuit, if operated isolated from the measurement circuit and the trigger circuit, is preferably capable of providing an output voltage Vout that is greater than the setpoint. The (actual) output voltage Vout provided by the boost circuit can be reduced to the setpoint by interaction of the boost circuit with the measurement circuit and the trigger circuit. Alternatively, it is preferred that the boost circuit itself is only capable of providing an output voltage Vout smaller than the setpoint, wherein the remainder is provided by the interaction of the boost circuit with the measurement circuit and the trigger circuit.

In order to adjust the output voltage Vout to the setpoint, a feedback is required. If the output voltage Vout is below or above the setpoint, the feedback is supposed to cause an increase or decrease of the output voltage Vout, respectively. The feedback is realized by the measurement circuit and the trigger circuit, wherein the measurement circuit is configured to detect whether the output voltage Vout is below or above the setpoint, and wherein the trigger circuit is configured to process this information in terms of adjusting the operation of the boost circuit accordingly. This way, the output voltage Vout can be kept at a constant value at any time, preferably at the setpoint. The communication between the measurement circuit and the trigger circuit is realized by the electrical trigger signal.

Depending on the difference between the output voltage Vout and the input voltage Vin, the measurement circuit emits the electrical trigger signal. The measurement circuit can be realized, e.g., by a voltmeter having an interface for transmitting information about a measurement of the difference between the output voltage Vout and the input voltage Vin. The electrical trigger signal can be, e.g., an electric current or a voltage, both either constant or varying with time (e.g. in terms of a pulse modulated signal).

Depending on the emitted electrical trigger signal the output voltage Vout can be adjusted via the trigger circuit. Once the output voltage Vout exceeds or falls below the setpoint, emission of the electrical trigger signal by the measurement circuit can cause the trigger circuit to adjust the output voltage Vout towards the setpoint.

In a preferred embodiment of the voltage converter the electrical trigger signal has a first value if the output voltage Vout exceeds the input voltage Vin at least by the fixed additional value Vf. Further, the electrical trigger signal has a second value, which is different from the first value, if the output voltage Vout does not exceed the input voltage Vin at least by the fixed additional value Vf.

Preferably, the first value is a finite value (different from zero), while the second value is zero. This is advantageous, as, in general, a distinction between a current having a finite value and no current at all is easier than a distinction between two different finite current strengths. In this embodiment, the electrical trigger signal is discretized, i.e. there are only two possible states (that are distinguished by the value of the electrical trigger signal). Each of these two states requires a respective response of the overall voltage converter circuit. In particular, the output voltage Vout is supposed to be increased or decreased, respectively. Therein, there is no need to specify quantitatively as to how the output voltage Vout has to be adjusted. Only is it required that the output voltage Vout is increased or decreased, respectively. This is due to the fact that once the (actual) output voltage Vout passes the setpoint, the respective response changes, and, hence, the output voltage Vout can be held at the setpoint. Any deviation from the setpoint causes the respective response as a counteraction. As the two different possible responses are triggered dependent on the fixed additional value Vf, the setpoint of the output voltage Vout is the sum of the input voltage Vin and the fixed additional value Vf. That is, the input voltage Vin can be increased to the output voltage Vout by adding the fixed additional value Vf.

In a further preferred embodiment of the voltage converter the boost circuit comprises at least an inductor, a first diode, a first capacitor, and a switch.

Preferably, a series connection is established between the voltage converter input, the inductor, the first diode and the voltage converter output (in the given order). Preferably, the first diode has a forward direction that is oriented from the voltage converter input towards the voltage converter output. Further, it is preferred that a connection between the inductor and the diode is grounded via the switch. Further, a connection between the first diode and the voltage converter output is grounded via the first capacitor. That is, the first capacitor is connected in parallel to the switch.

In particular, in this preferred case, a current can flow from the voltage converter input through the inductor and through the switch to ground if the switch is closed. If the switch is then opened, the first capacitor can be charged as electromagnetic induction causes the inductor to drive the current to prevent it from decreasing (coinciding with a decreasing magnetic field generated by the inductor). This is in part what is also found in an oscillating circuit, wherein an inductor drives a current for charging a capacitor. In this case, however, an oscillation as found in an oscillating circuit can be inhibited by the first diode (as the first diode has a respective forward direction). Therein, it is preferably ensured that the first diode is capable of blocking a current for any expectable voltage drop across the first diode in reverse direction.

A boost circuit according to this embodiment can be capable of increasing the input voltage Vin to the output voltage Vout. The obtainable output voltage Vout, in particular the value and time dependence of which, depends on an operation of the switch. In order to obtain predictable results, it is, hence, preferred that the switch is not operated randomly.

In particular for this reason, a further preferred embodiment of the voltage converter is presented, in which the switch comprises a field effect transistor. Therein, a gate terminal of the field effect transistor is at least connected to a switching signal generator to generate a switching signal to switch the field effect transistor periodically.

It is preferred that the switching signal has a constant frequency. This facilitates obtaining a constant output voltage Vout. Assume the switch is closed for a closed time DT and open for an open time $(1-a)T$, wherein $0<a<1$ is a constant characterizing the switching signal and T the period of the switching signal. For that case, it can be derived mathematically that the output voltage Vout is increased over the input voltage Vin by a factor of $(1-a)^{-1}$. For example, if $a=0.5$ (i.e. the switch is opened and closed for equally long times), the output voltage Vout has twice the value of the input voltage Vin.

In order to have the input voltage Vin increased to the output voltage Vout by adding the fixed additional value Vf (which does not depend on the input voltage Vin, which would be the case if the boost circuit was operated without the measurement circuit and the trigger circuit), it is preferred that the described operation of the boost circuit can be influenced externally, in particular by the measurement circuit and the trigger circuit.

According to a further preferred embodiment of the voltage converter the measurement circuit comprises at least a third diode and a current amplifier.

The current amplifier may be any advice capable of increasing a current strength of a current that enters the current amplifier via a current amplifier input and that leaves the current amplifier via a current amplifier output. Preferably, the amplification can be controlled via a control terminal of the current amplifier.

In a further preferred embodiment of the voltage converter a voltage difference across the third diode is equal to the difference of the output voltage Vout and the input voltage Vin if the third diode is in a reverse blocking mode.

Preferably, the third diode is connected at least to both the voltage converter input (which is held at a potential equal to the input voltage Vin) and the voltage converter output (which is held at a potential equal to the output voltage Vout). Therein, the voltage difference across the third diode is equal to the difference of the output voltage Vout and the input voltage Vin. It is preferred that the third diode has a forward direction oriented form the voltage converter input towards the voltage converter output. However, it is also preferred that a current between the third diode and the voltage converter input is constrained (and even more preferred that there is no such current at all). Therefore, a resistor is preferably introduced between the third diode and the voltage converter input. In this case, the voltage difference across the third diode is reduced by the current through the resistor multiplied by its resistance value (Ohm's law). That is, in particular, if no current flows through the third diode and said resistor (which is, in particular, the case if the third diode is in the reverse blocking mode), the voltage difference across the third diode is equal to the output voltage Vout and the input voltage Vin. The third diode is in the reverse blocking mode if the voltage difference across the third diode is smaller than required for a breakdown in reverse direction (which is opposite to the forward direction), i.e. the third diode is biased in reverse direction, whereas the bias voltage is not sufficient for a reverse breakdown. In the reverse blocking mode no current can flow through the third diode.

In a further preferred embodiment of the voltage converter the third diode is a Zener diode having a reverse breakdown voltage Vb. Therein, the fixed additional value Vf is equal to the reverse breakdown voltage Vb of the Zener diode.

If the output voltage Vout exceeds the input voltage Vin by less than the fixed additional value Vf, the third diode is in the reverse blocking mode, which is a state, in which no current flows through the third diode biased in reverse direction. In that case, preferably, the measurement circuit does not affect any other components of the voltage converter, i.e. the measurement is preferably idle. This is preferably the case if the output voltage Vout is below the setpoint so that the boost circuit is configured for increasing the output voltage Vout. However, if the voltage Vout does exceed the input voltage Vin by more than the breakdown voltage Vb, there is a current through the third diode.

The fact that the fixed additional value Vf is equal to the reverse breakdown voltage Vb means that the fixed additional value Vf can be chosen by the reverse breakdown voltage Vb, i.e. by a property of the third diode.

In a further preferred embodiment of the voltage converter the current amplifier is a Darlington transistor.

Therein, it is preferred that the current amplifier input is the emitter of the Darlington transistor, the current amplifier output is the collector of the Darlington transistor and the control terminal of the current amplifier is the base terminal of the Darlington transistor.

In a further preferred embodiment of the voltage converter the electrical trigger signal is a trigger current emitted by the measurement circuit only if the third diode is in a reverse breakdown mode.

The third diode is in the reverse breakdown mode if the voltage difference across the third diode is larger than required for a breakdown in reverse direction, i.e. the third diode is biased in reverse direction, whereas the voltage bias is sufficient for a reverse breakdown. In the reverse breakdown mode a current can flow through the third diode in reverse direction. It is preferred that the third diode is a Zener diode because a Zener diode is characterized in that it is capable of being operated in its reverse breakdown mode for a longer time than other diodes (which can more likely be dam-aged if operated in the reverse breakdown mode).

In a further preferred embodiment of the voltage converter the trigger current results from a current amplification by the current amplifier.

Preferably, the third diode is connected between the current amplifier input and the voltage converter output. Further, the current amplifier output preferably forms a measurement circuit output, via which the electrical trigger signal can be emitted.

That is, if the output voltage Vout exceeds the setpoint, the voltage difference across the third diode exceeds the breakdown voltage Vb, a current can flow through the third diode, be amplified by the current amplifier and be emitted by the measurement circuit as the trigger current.

In a further preferred embodiment of the voltage converter the trigger circuit comprises at least a first bipolar transistor and a ground.

Preferably, the first bipolar transistor can be switched between a non-conducting mode and a conducting mode depending on the electrical trigger signal, which is applied to a base terminal of the first bipolar transistor (wherein it is preferred that the electrical trigger signal is the trigger current). Preferably, the first bipolar transistor is in the non-conducting mode if there is no trigger current, and in the conducting mode if there is a trigger current that exceeds a threshold value. This is preferably exploited for adjusting the output voltage Vout, in particular for reducing the output voltage Vout.

In a further preferred embodiment of the voltage converter the trigger current is configured to drain the switching signal to ground depending on the electrical trigger signal.

If the switching signal is drained to ground, it does not reach the field effect transistor and, in particular, the gate terminal thereof. Hence, the periodical switching of the field effect transistor is interrupted. In particular, it is preferred that the field effect transistor remains open if the switching signal is drained to ground. In that case the output voltage Vout decreases.

The switching signal generator can be considered to be comprised within both the boost circuit and the trigger circuit.

BRIEF DESCRIPTION OF THE DRAWINGS

It should be noted that the individual features specified in the claims may be combined with one another in any desired technological reasonable manner and form further embodiments of the invention. The specification, in particular in connection with the FIGURE, explains the invention further and specifies particularly preferred embodiments of the invention. Particularly preferred variants of the invention and also the technical field will now be explained in more detail on the basis of the enclosed FIGURE. It should be noted that the exemplary embodiments shown in the FIGURE are not intended to restrict the invention. The FIGURE is schematic and may not be to scaled. The FIGURE displays:

The FIGURE is a circuit diagram of a voltage converter.

DETAILED DESCRIPTION OF THE PRESENTLY PREFERRED EMBODIMENTS

The FIGURE shows a voltage converter 1 comprising a boost circuit 2, a measurement circuit 3, and a trigger circuit 5. The voltage converter 1 is configured to convert an input voltage Vin to an output voltage Vout by adding a fixed additional value Vf.

The boost circuit 2 comprises a voltage converter input 30, which is held at a potential equal to the input voltage Vin. The input voltage Vin is provided by a voltage source 6, a positive terminal of which is connected to the voltage converter input 30. A negative terminal of the voltage source 6 is grounded to a ground 10. Further, the boost circuit 2 comprises a voltage converter output 31, which has a potential equal to the output voltage Vout. Between the voltage converter input 30 and the voltage converter output 31 a series connection is established comprising an inductor 7, a first diode 14 and a second diode 15. Both the first diode 14 and the second diode 15 have a respective forward direction that is oriented from the voltage converter input 30 towards the voltage converter output 31. Further, a connection between the inductor 7 and the first diode 14 is grounded via a switch 8, a connection between the first diode 14 and the second diode 15 is grounded via a first resistor 19 and, in parallel, via a second capacitor 18, and a connection between the second diode 15 and the voltage converter output 31 is grounded via a first capacitor 17. The switch 8 comprises a field effect transistor 27. A gate terminal of the field effect transistor 27 is connected to a switching signal generator 9 via a fifth resistor 23. The fifth resistor 23 is configured for reducing a current strength of the switching signal. This may be necessary depending on the current strength of the switching signal emitted by the switching signal generator 9 in relation to properties of the field effect transistor 27.

As described above, the inductor 7, the first diode 14, the first capacitor 17 and the switch 8 are configured for voltage conversion, in particular, as the switch 8 is realized as a field effect transistor 27 connected to the switching signal generator 9. In addition to this, the first resistor 19 is introduced. Preferably, the first resistor 19 has a resistance that is large compared with other relevant resistance values. It is included in this example for simulation purposes, but might also be omitted. The first resistor 19 may be considered a load that is connected to the voltage converter 1.

Further, the second diode 15 and the second capacitor 18 have been added, in particular for smoothing the time development of the output voltage Vout. The second diode 15 can prevent the second capacitor 18 from being completely discharged immediately, once the output voltage Vout exceeds the setpoint (causing the emission of a trigger current, which, without the second diode 15, would be fed at least in part by the charge on the second capacitor). Further, with the second diode 15 and the second capacitor 18 a possibility is provided to tap a further output voltage from an optional voltage output 32 in addition to the output voltage that can be tapped from the voltage converter output 31. This may be useful for applications requiring two such output voltages.

The measurement circuit 3 comprises a third diode 16, which is realized as a Zener diode 28. Further, the measurement circuit 3 comprises a current amplifier 11, which is realized as a Darlington transistor 29 having a second bipolar transistor 25 and a third bipolar transistor 26. The current amplifier 11 has a current amplifier input 12 and a current amplifier output 13. The current amplifier output 13 forms a measurement circuit output 4. The third diode 16 is connected to a connection between the first diode 14 and the second diode 15 (of the boost circuit 2) and to the current amplifier input 12, wherein a forward direction of the third diode 16 is oriented from the current amplifier input 12 towards the connection between the first diode 14 and the second diode 15. Via a second resistor 20 the voltage converter input 30 is connected to the current amplifier input 12. Assuming that the first diode 14 and the second diode 15 are ideal in a sense that their resistance in forward direction is zero and that the third diode 16 is in a reverse blocking mode (i.e. no current flows through the third diode 16 and, hence, no voltage drop occurs across the second resistor 20), the voltage difference across the third diode 16 is equal to the voltage difference between the input voltage Vin and the output voltage Vout. A current through the third diode 16 may only flow if the difference between the input voltage Vin and the output voltage Vout exceeds the breakdown voltage Vb of the third diode 16. If this is the case, said current is amplified by the current amplifier 11. The current exiting the current amplifier output 13 and thereby being emitted from the measurement circuit output 4 is the trigger current. In order for the Darlington transistor 29 to be operated as the current amplifier 11, a base terminal of the Darlington transistor 29 is connected to the positive terminal of the voltage source 6. This is, in particular, required as the current amplification by the current amplifier 11 requires a current source (due to charge conservation).

The trigger current, once emitted by the measurement circuit 3, is guided to the trigger circuit 5, thereby establishing an interaction between the measurement circuit 3 and the trigger circuit 5. The trigger circuit 5 comprises a first bipolar transistor 24, wherein the trigger current is applied to a base terminal of the first bipolar transistor 24. Further, a collector terminal of the first bipolar transistor 24 is connected at least to the switching signal generator 9 and an emitter terminal of the first bipolar transistor 24 is grounded. In order to reduce the current strength applied to the base terminal of the first bipolar transistor 24 a third resistor 21 is introduced. Further, in order to reduce the voltage applied to the base terminal of the first bipolar transistor 24, a fourth resistor 22 is introduced between the base terminal of the first bipolar transistor 24 and a ground 10.

If the first bipolar transistor 24 is in the conducting mode, i.e. if the trigger current is emitted by the measurement circuit 3 and received by the trigger circuit 5, the switching signal generated by the switching signal generator 9 is drained to ground via the first bipolar transistor 24. This way, the above described amplification of the input voltage Vin is interrupted, reducing the output voltage Vout. As the trigger current is emitted if the output voltage Vout exceeds the setpoint, the output voltage Vout can be kept at the setpoint. As the setpoint is the sum of the input voltage Vin and the fixed additional value Vf, the input voltage Vin can be increased to the output voltage Vout by adding the fixed additional value Vf. As the fixed additional value Vf is equal to the breakdown voltage Vb of the third diode 16, the fixed additional value Vf is independent of the input voltage Vin.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A voltage converter comprising:
   a boost circuit configured to convert an input voltage Vin to an output voltage Vout comprising:
      an inductor;
      a first diode coupled to the inductor; and
      a switch directly connected to a node between the inductor and the first diode;
   a measurement circuit configured to emit an electrical trigger signal based on a difference between the output voltage Vout and the input voltage Vin, wherein the measurement circuit comprises:
      at least a third diode; and
   a trigger circuit configured to adjusting the output voltage Vout based on the electrical trigger signal such that:
      a setpoint for the output voltage Vout is larger than the input voltage Vin by a fixed additional value Vf, and
      the fixed additional value Vf is independent of the input voltage Vin, wherein one of:
the electrical trigger signal is a trigger current emitted by the measurement circuit only if the third diode is in a reverse breakdown mode and
a voltage difference across the third diode is equal to the difference of the output voltage Vout and the input voltage Vin if the third diode is in a reverse blocking mode.

2. The voltage converter according to claim 1, wherein the electrical trigger signal comprises:
a first value if the output voltage Vout exceeds the input voltage Vin at least by a fixed additional value Vf, and
a second value, which is different from the first value, if the output voltage Vout does not exceed the input voltage Vin at least by the fixed additional value Vf.

3. The voltage converter according to claim 1, wherein the boost circuit further comprises:
a first capacitor coupled to the first diode.

4. The voltage converter according to claim 3, wherein the switch comprises:
a field effect transistor, wherein a gate terminal of the field effect transistor is connected at least to a switching signal generator configured to generate a switching signal for switching the field effect transistor periodically.

5. The voltage converter according to claim 1, wherein the measurement circuit further comprises:
a current amplifier coupled to the third diode.

6. The voltage converter according to claim 1, wherein the trigger circuit comprises at least a first bipolar transistor coupled to a ground.

7. The voltage converter according to claim 1, wherein the trigger circuit is configured to drain a switching signal to ground depending on the electrical trigger signal.

8. The voltage converter according to claim 5, wherein the current amplifier is a Darlington transistor.

9. A voltage converter comprising:
a boost circuit configured to convert an input voltage Vin to an output voltage Vout;
a measurement circuit configured to emit an electrical trigger signal based on a difference between the output voltage Vout and the input voltage Vin, wherein the measurement circuit comprises:
at least a third diode; and
a current amplifier coupled to the third diode; and
a trigger circuit configured to adjusting the output voltage Vout based on the electrical trigger signal such that:
a setpoint for the output voltage Vout is larger than the input voltage Vin by a fixed additional value Vf, and
the fixed additional value Vf is independent of the input voltage Vin,
wherein a voltage difference across the third diode is equal to the difference of the output voltage Vout and the input voltage Vin if the third diode is in a reverse blocking mode.

10. The voltage converter according to claim 9, wherein the third diode is a Zener diode having a reverse breakdown voltage Vb, and wherein the fixed additional value Vf is based on the reverse breakdown voltage Vb of the Zener diode.

11. A voltage converter comprising:
a boost circuit configured to convert an input voltage Vin to an output voltage Vout;
a measurement circuit configured to emit an electrical trigger signal based on a difference between the output voltage Vout and the input voltage Vin, wherein the measurement circuit comprises:
at least a third diode; and
a current amplifier coupled to the third diode; and
a trigger circuit configured to adjusting the output voltage Vout based on the electrical trigger signal such that:
a setpoint for the output voltage Vout is larger than the input voltage Vin by a fixed additional value Vf, and
the fixed additional value Vf is independent of the input voltage Vin,
wherein the electrical trigger signal is a trigger current emitted by the measurement circuit only if the third diode is in a reverse breakdown mode.

12. The voltage converter according to claim 11, wherein the trigger current results from a current amplification by the current amplifier.

* * * * *